United States Patent
Nakayari

(10) Patent No.: US 12,526,512 B2
(45) Date of Patent: Jan. 13, 2026

(54) IMAGE CAPTURING APPARATUS, CONTROL METHOD OF IMAGE CAPTURING APPARATUS, AND NON-TRANSITORY COMPUTER-READABLE STORAGE MEDIUM STORING COMPUTER PROGRAM

(71) Applicant: CANON KABUSHIKI KAISHA, Tokyo (JP)

(72) Inventor: Tatsuya Nakayari, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 18/775,327

(22) Filed: Jul. 17, 2024

(65) Prior Publication Data
US 2025/0056114 A1 Feb. 13, 2025

(30) Foreign Application Priority Data
Aug. 10, 2023 (JP) .................................. 2023-131470

(51) Int. Cl.
*H04N 23/63* (2023.01)
*H04N 23/611* (2023.01)
*H04N 23/661* (2023.01)
*H04N 23/695* (2023.01)

(52) U.S. Cl.
CPC ......... *H04N 23/635* (2023.01); *H04N 23/611* (2023.01); *H04N 23/661* (2023.01); *H04N 23/695* (2023.01)

(58) Field of Classification Search
CPC .. H04N 23/611; H04N 23/633; H04N 23/635; H04N 23/661; H04N 23/695
See application file for complete search history.

(56) References Cited

U.S. PATENT DOCUMENTS

| | | | | |
|---|---|---|---|---|
| 2007/0266312 A1* | 11/2007 | Ayaki | .................... | H04N 23/635 715/273 |
| 2008/0259159 A1* | 10/2008 | Nystrom | ................ | H04N 7/185 348/E5.042 |
| 2016/0028939 A1* | 1/2016 | Ogawa | .................... | H04N 23/69 348/346 |
| 2021/0099641 A1* | 4/2021 | Mori | ....................... | H04N 23/64 |

FOREIGN PATENT DOCUMENTS

| | | |
|---|---|---|
| JP | 2009188975 A | 8/2009 |
| JP | 2013030929 A | 2/2013 |

OTHER PUBLICATIONS

Machine translation of JP2009-188975 published Aug. 20, 2009.*

* cited by examiner

*Primary Examiner* — Daniel M Pasiewicz
(74) *Attorney, Agent, or Firm* — Cowan, Liebowitz & Latman, P.C.

(57) ABSTRACT

An image capturing apparatus comprising: an image output unit configured to acquire an image generated by an image capturing unit capturing an image of a subject, and output an image of either a video or a still image obtained by pausing the video; and an information output unit configured to update and output additional information including at least one of a position and a range of the subject in a case where the video is being output, and stop the updating of the additional information and output the additional information in a case where the still image is being output.

13 Claims, 9 Drawing Sheets

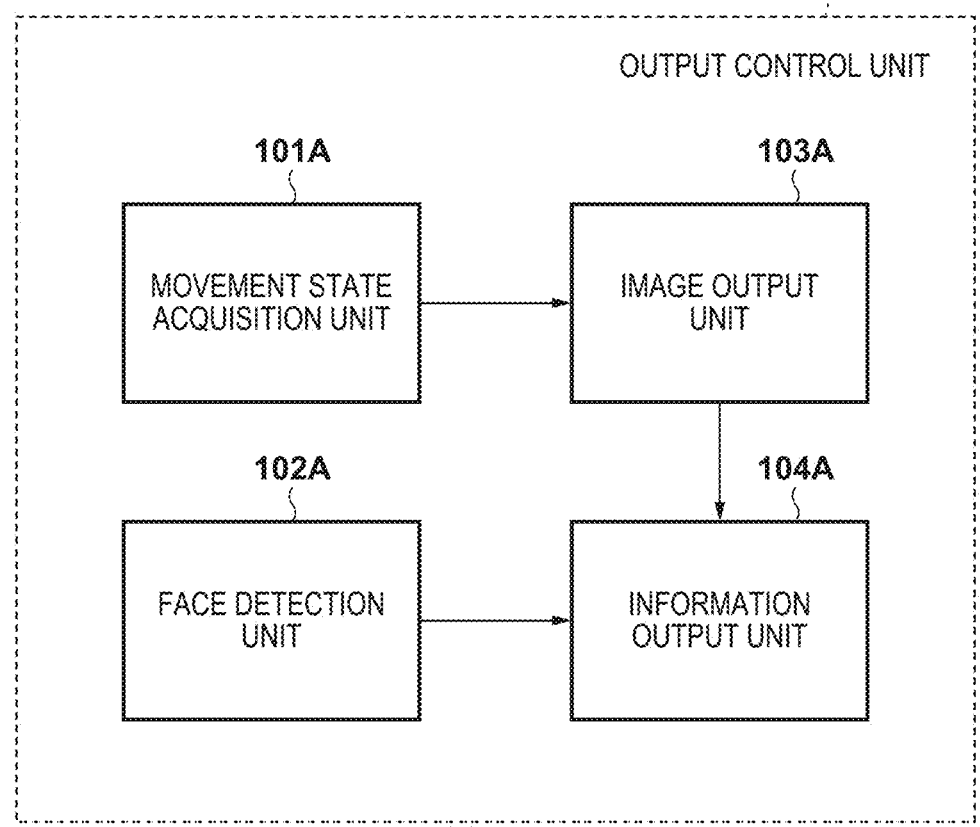

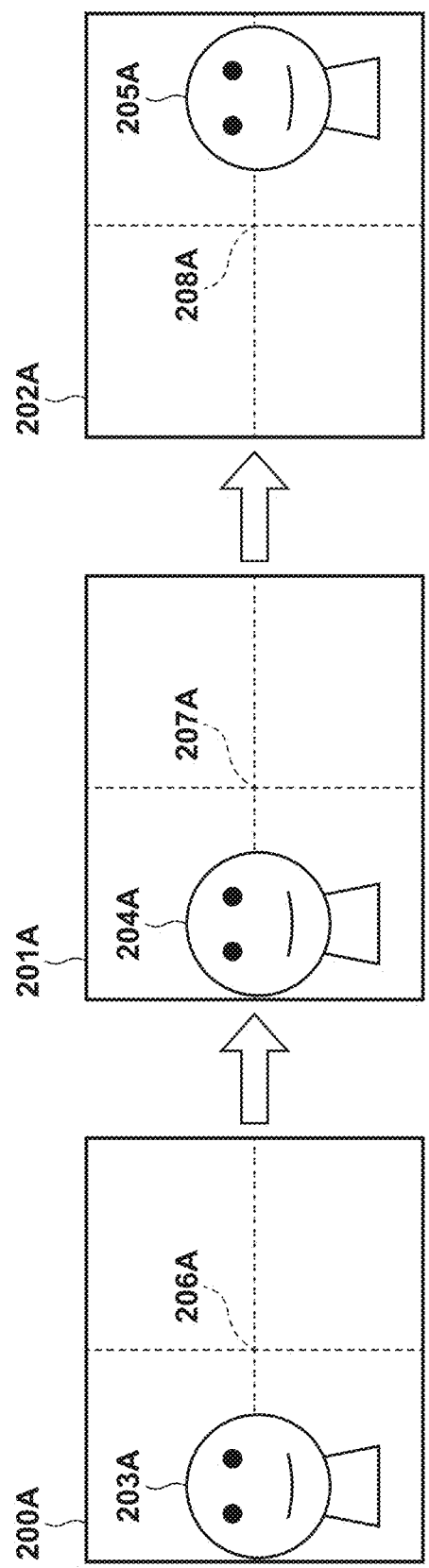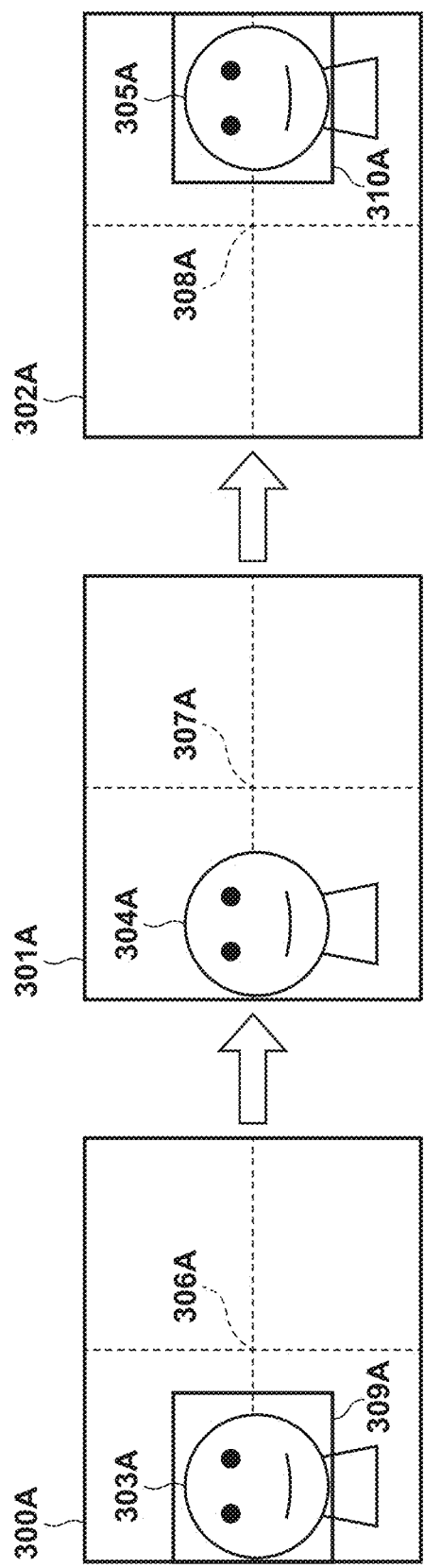

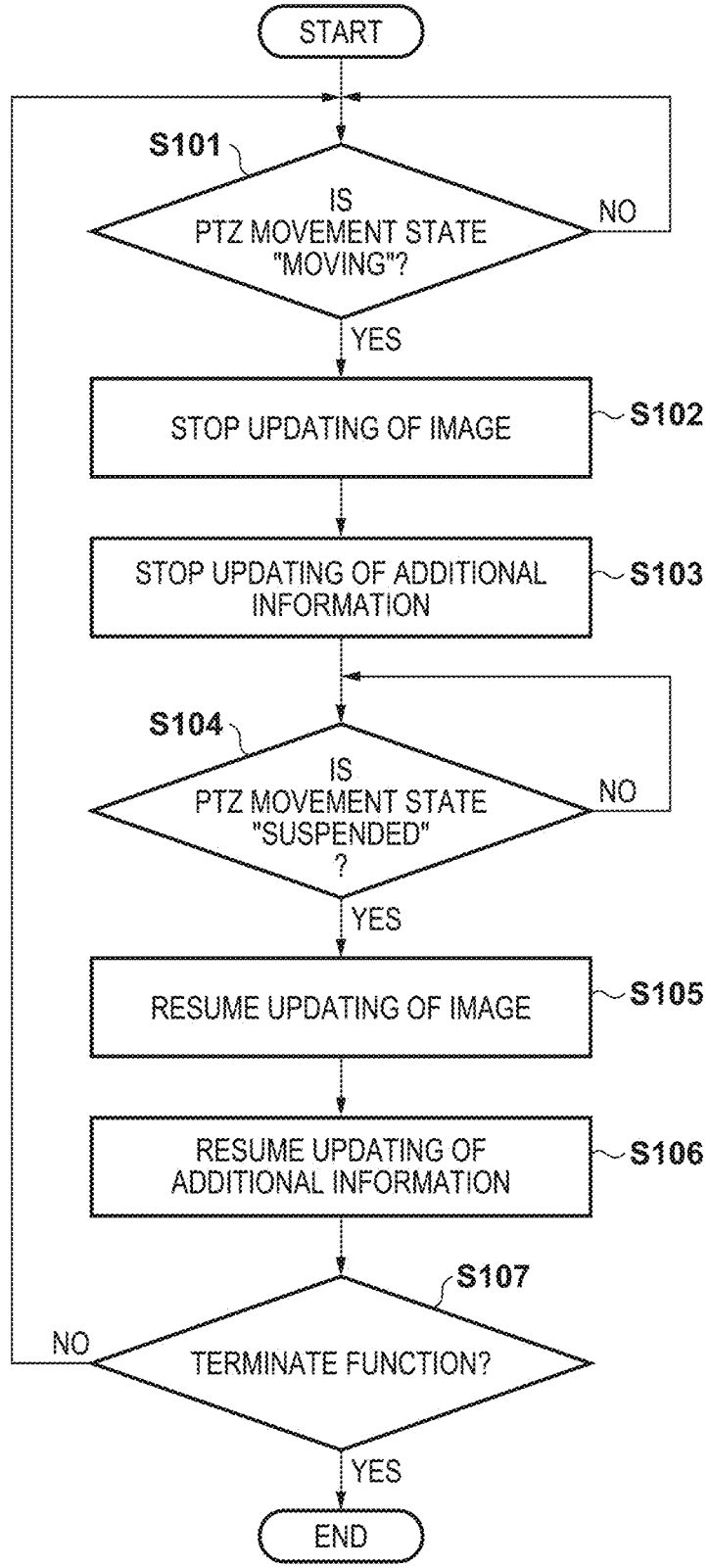

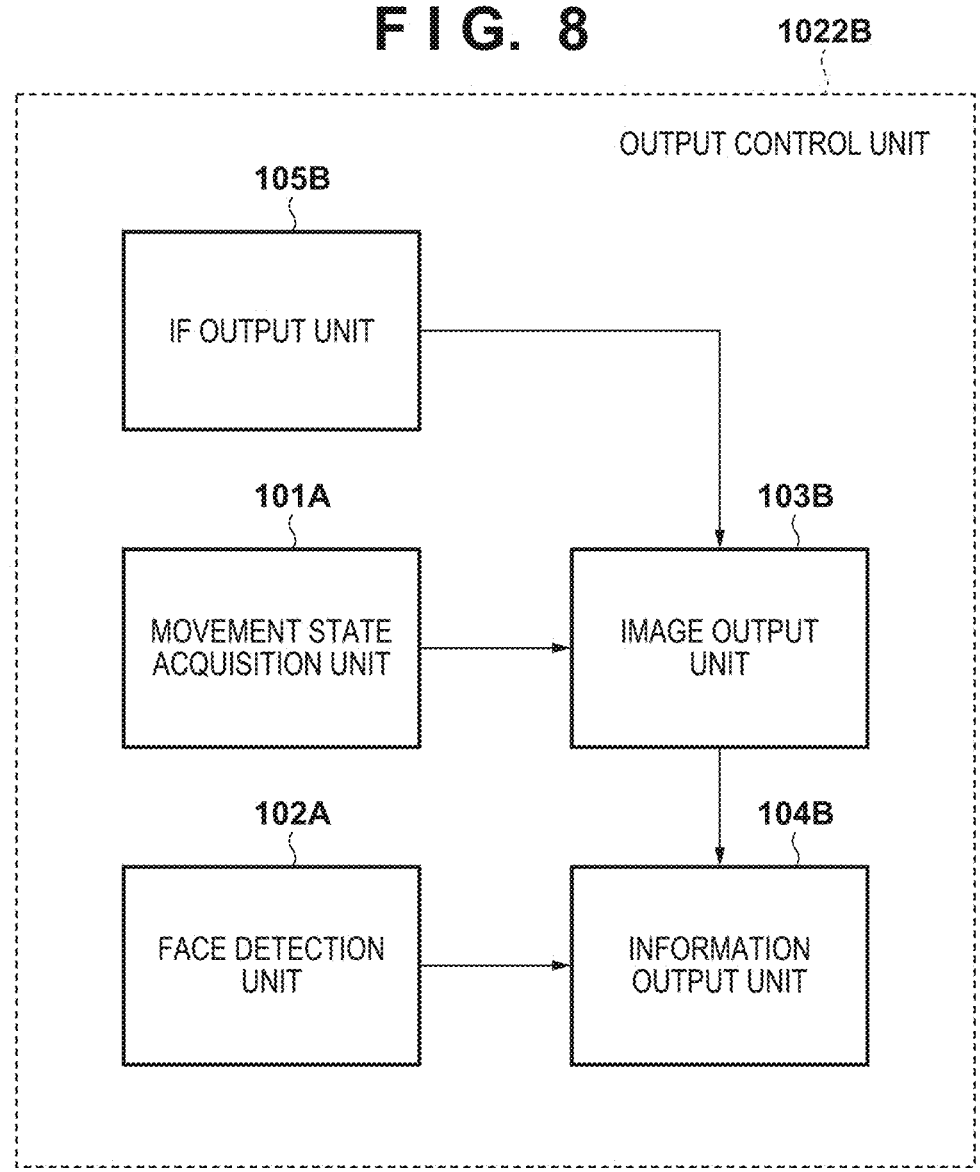

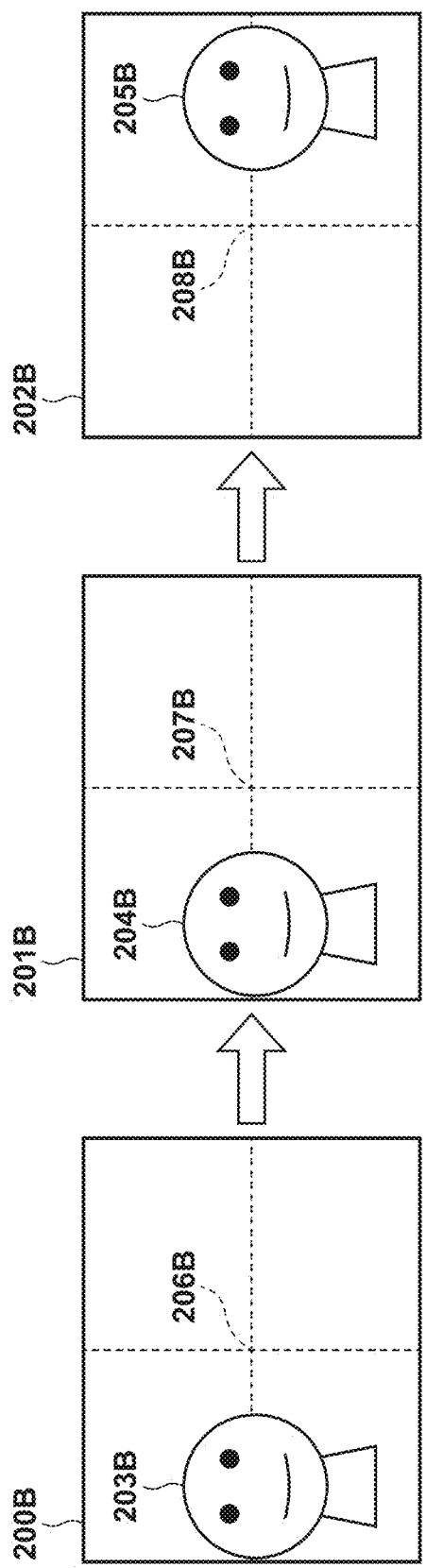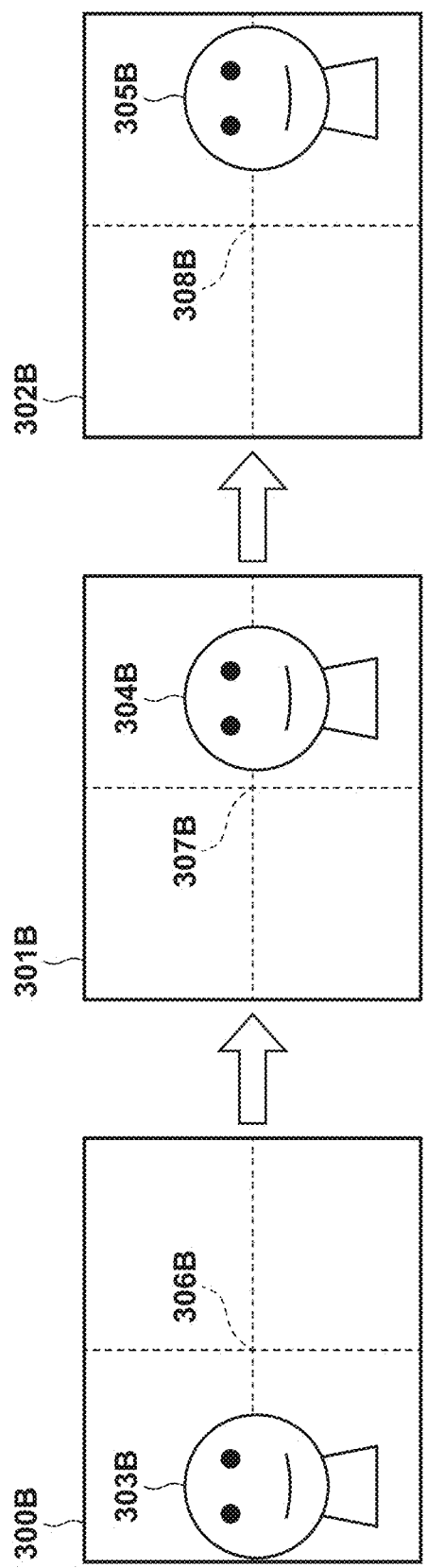

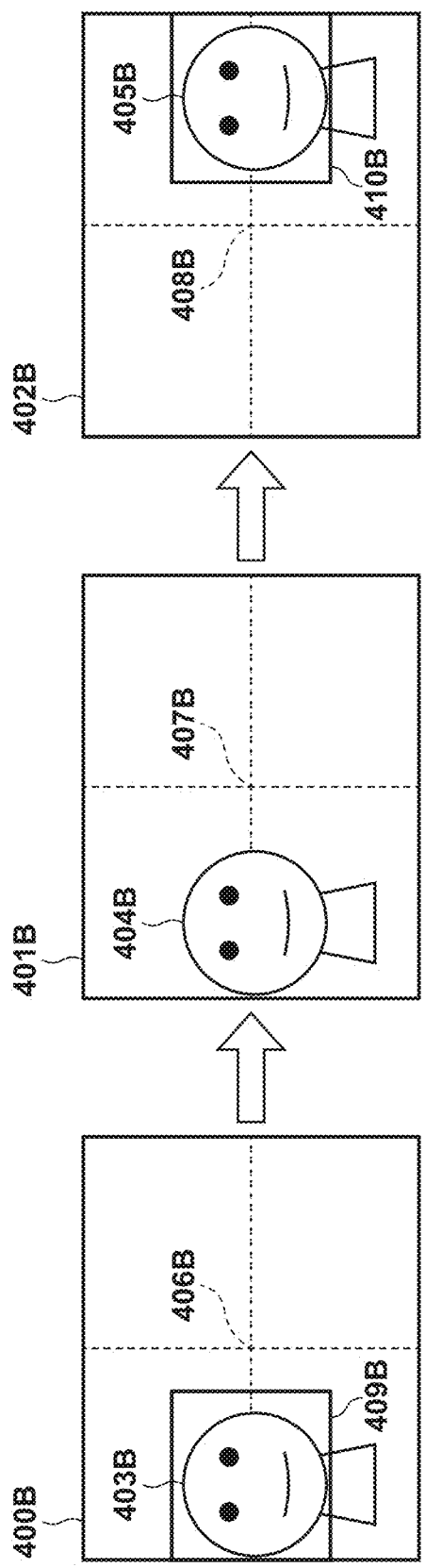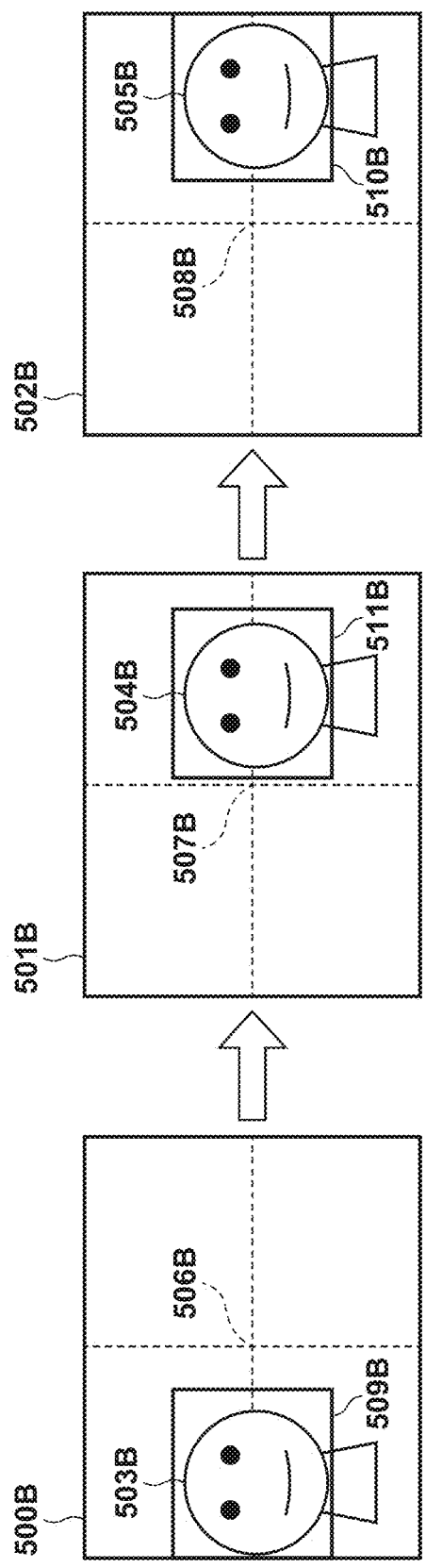

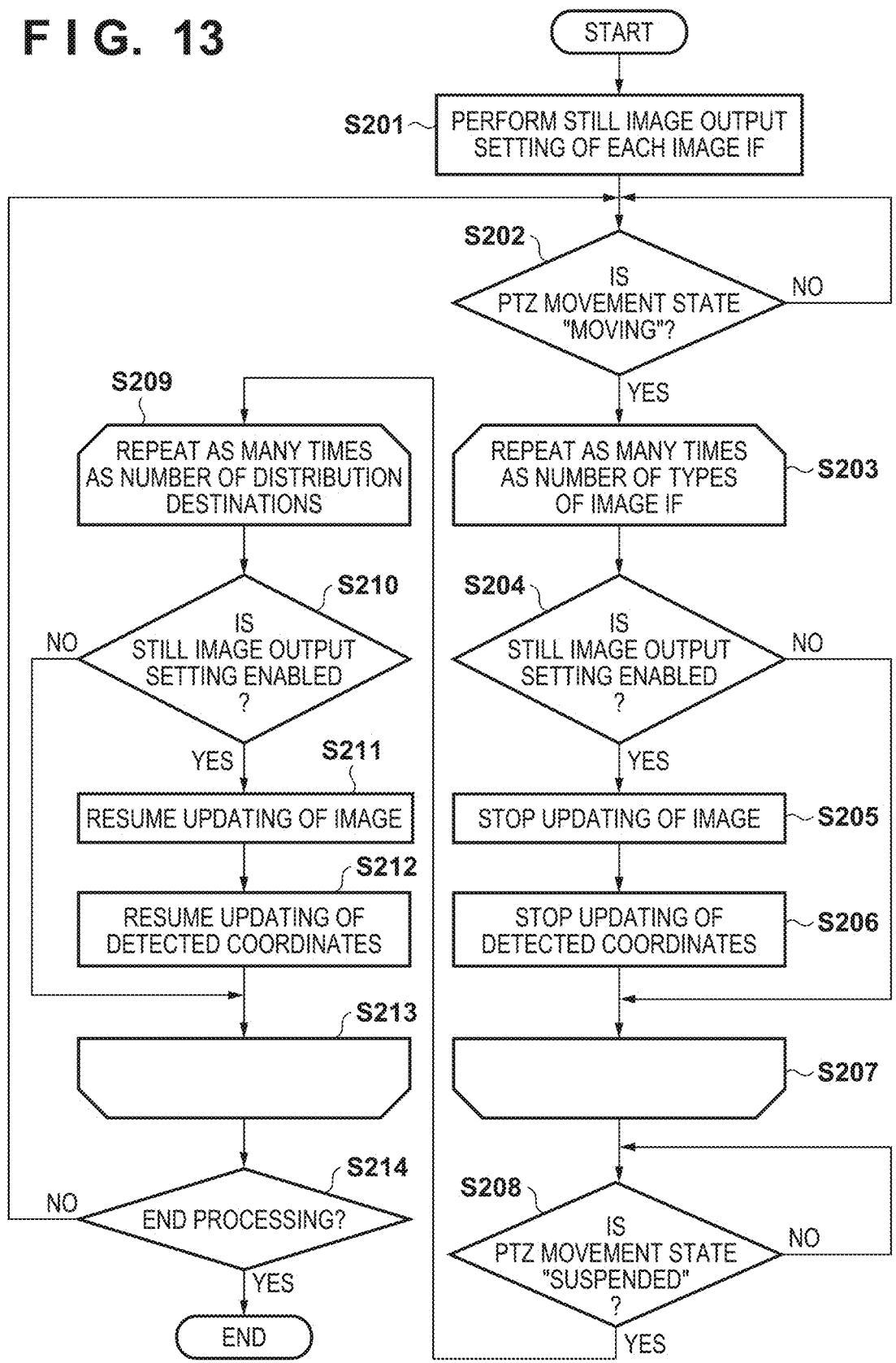

IMAGE CAPTURING APPARATUS, CONTROL METHOD OF IMAGE CAPTURING APPARATUS, AND NON-TRANSITORY COMPUTER-READABLE STORAGE MEDIUM STORING COMPUTER PROGRAM

BACKGROUND OF THE INVENTION

Field of the Invention

The present invention relates to an image capturing apparatus, a control method of an image capturing apparatus, and a non-transitory computer-readable storage medium storing a computer program.

Description of the Related Art

In recent years, the expanding video distribution market is accelerating increase of image shooting systems that shoot video of weddings or lectures by using cameras that have capability of remote control and video shooting via a network. Among such cameras, some cameras are known to have a preset function that enables storing (registering) a combination pattern of pan, tilt and zoom (denoted PTZ in the following) at each position in advance for a corresponding specific image capturing field of view, and enables calling and setting PTZ information of the registered pattern by a predetermined operation.

When PTZ movement is performed to a preset angle-of-view registered in the camera using the preset function, images during the movement are shot. But in some application, for example, like a case where the PTZ movement speed is high, such images are not desired to be displayed. The technology is disclosed in Japanese Patent Laid-Open No. 2009-188975 for the case where the images during the movement are not desired to be displayed, such that a still image captured immediately before the operation is transmitted during the pan/tilt operation. Alternatively, the technology is disclosed in Japanese Patent Laid-Open No. 2013-30929 in which a sub-preset is prepared on the way of movement from a preset position to a preset position and image distribution is not performed at any position other than the start position, the stop position, and the sub-preset position.

However, although the still image is output during the PTZ movement or the like by the conventional technique disclosed in Japanese Patent Laid-Open No. 2009-188975 or Japanese Patent Laid-Open No. 2013-30929, information related to the position and the range of an object, such as a face, in the image according to the face detection coordinates is output which is updated with the videos. And thus, there is a problem that additional information is output that is updated but not corresponding to a still image obtained by pausing the video.

SUMMARY OF THE INVENTION

According to one aspect of the present disclosure, there is provided an image capturing apparatus comprising: an image output unit configured to acquire an image generated by an image capturing unit capturing an image of a subject, and output an image of either a video or a still image obtained by pausing the video; and an information output unit configured to update and output additional information including at least one of a position and a range of the subject in a case where the video is being output, and stop the updating of the additional information and output the additional information in a case where the still image is being output.

According to another aspect of the present disclosure, there is provided a control method of an image capturing apparatus, the method comprising: acquiring an image generated by an image capturing unit capturing an image of a subject, and outputting an image of either a video or a still image obtained by pausing the video; and updating and outputting additional information including at least one of a position and a range of the subject in a case where the video is being output, and stopping the updating of the additional information, and outputting the additional information in a case where the still image is being output.

According to another aspect of the present disclosure, there is provided a non-transitory computer-readable storage medium storing a computer program that, when the program is read and executed by a computer, causes the computer to: acquire an image generated by an image capturing unit capturing an image of a subject, and output an image of either a video or a still image obtained by pausing the video; and update and output additional information including at least one of a position and a range of the subject in a case where the video is being output, or stop the updating of the additional information and output the additional information in a case where the still image is being output.

Further features of the present invention will become apparent from the following description of exemplary embodiments (with reference to the attached drawings).

BRIEF DESCRIPTION OF THE DRAWINGS

FIG. 4 is a block configuration diagram of an output control unit according to a first embodiment;

FIG. 5 is a diagram illustrating an example of an image output in pan movement according to the first embodiment;

FIG. 6 is a diagram illustrating an example of a transition of a frame of a face in pan movement according to the first embodiment;

FIG. 7 is a flowchart illustrating a processing procedure of the output control unit according to the first embodiment;

FIG. 8 is a block configuration diagram of an output control unit according to a second embodiment;

FIG. 9 is a diagram illustrating transition of an angle-of-view when still image setting of an image IF according to the second embodiment is set to be output setting;

FIG. 10 is a diagram illustrating transition of an angle-of-view when the still image setting of the image IF according to the second embodiment is set to be not-output setting;

FIG. 11 is a diagram illustrating a control to output detected coordinates in accordance with the still image output transition when the still image setting of the image IF according to the second embodiment is set to be output setting;

FIG. 12 is a diagram illustrating a control to output detected coordinates in accordance with the still image output transition when the still image setting of the image IF according to the second embodiment is set to be not-output setting; and FIG. 13 is a flowchart illustrating a processing procedure of the output control unit according to the second embodiment.

DESCRIPTION OF THE EMBODIMENTS

Figure 1:
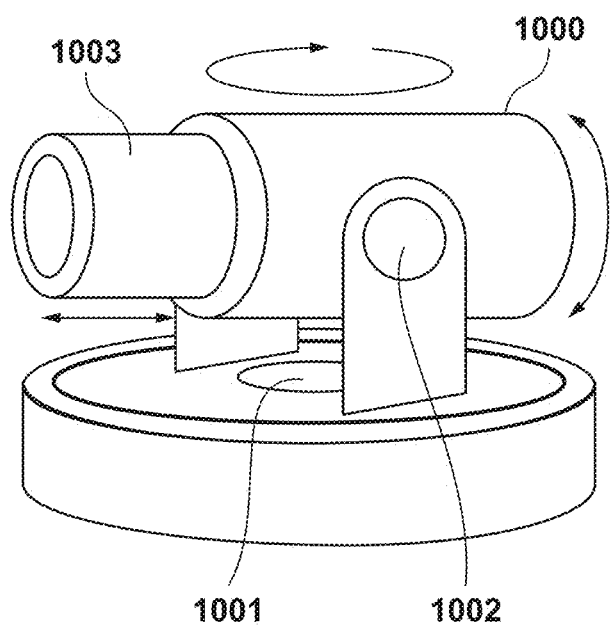
FIG. 1 is a configuration diagram illustrating an example of an image capturing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a diagram illustrating an image capturing apparatus 1000, which is one of the embodiments of the present invention. The image capturing apparatus 1000 includes a pan driving mechanism 1001, a tilt driving mechanism 1002, and a zoom mechanism 1003.

The pan driving mechanism 1001 can change an image capturing region of the image capturing apparatus 1000 to a pan direction. The tilt driving mechanism 1002 can change the image capturing region of the image capturing apparatus 1000 to a tilt direction. The zoom mechanism 1003 changes the angle-of-view of the image capturing apparatus 1000.

Figure 2:
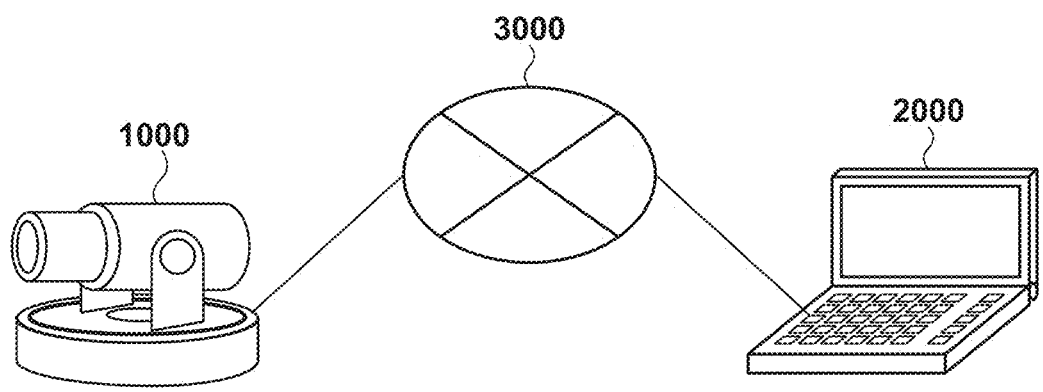
FIG. 2 is a configuration diagram illustrating an example of an image capturing system.

FIG. 2 is a system configuration diagram including the image capturing apparatus 1000. The system includes the image capturing apparatus 1000 and a client apparatus 2000. The client apparatus 2000 is an example of an external device. The image capturing apparatus 1000 and the client apparatus 2000 are connected in a state in which they are able to communicate with each other via the network 3000. The client apparatus 2000 transmits control commands related to angle-of-view control and image quality control to the image capturing apparatus 1000. The image capturing apparatus 1000 transmits a response to the command of angle-of-view control and image quality control to the client apparatus 2000.

Figure 3:
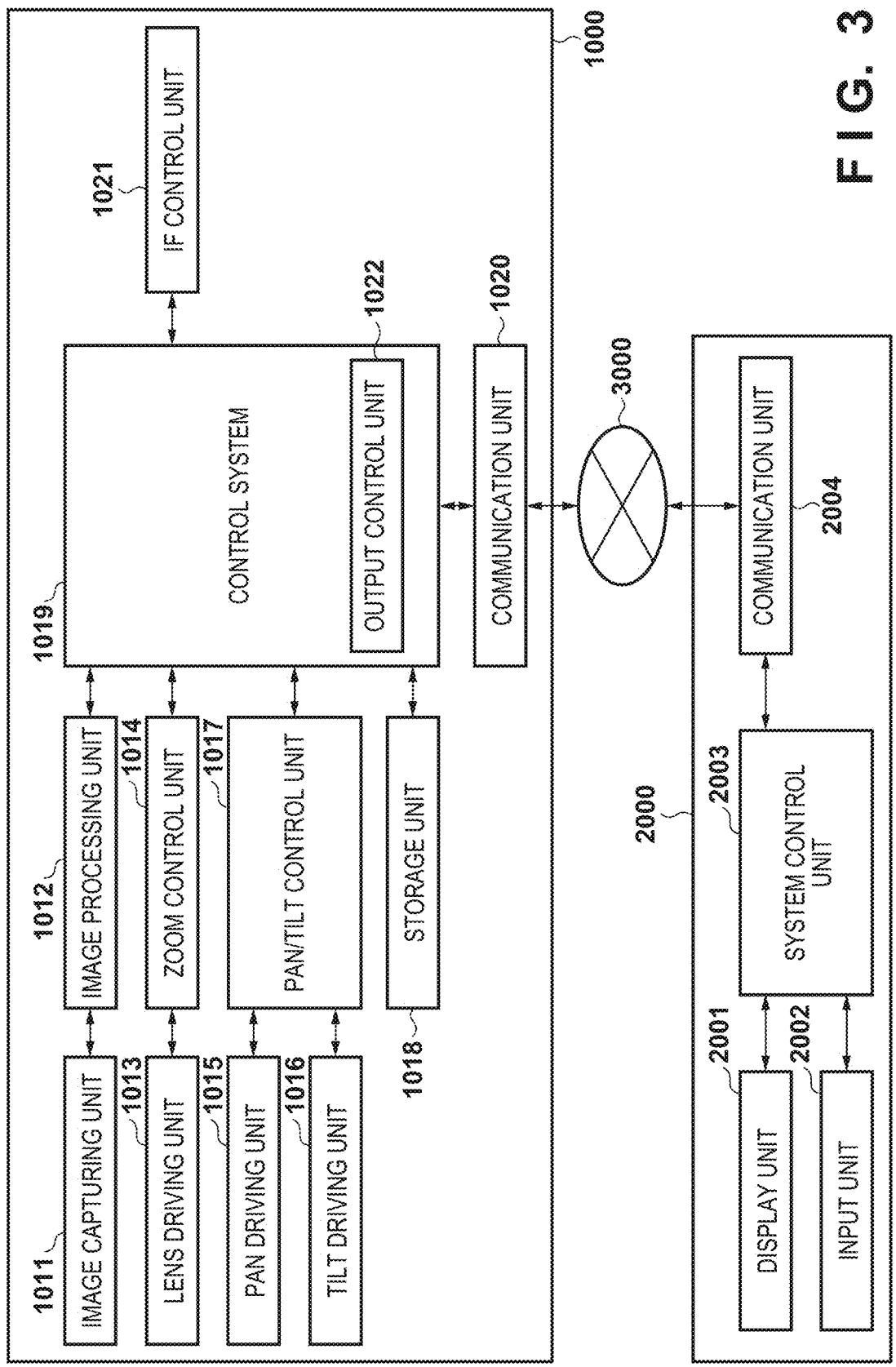
FIG. 3 is a diagram illustrating an example of each configuration and function of the image capturing apparatus and a client apparatus.

FIG. 3 is a diagram illustrating an example of each configuration and function of the image capturing apparatus 1000 and the client apparatus 2000.

The image capturing apparatus 1000 is, for example, a digital camera that can convert optical signals into electric signals. The image capturing apparatus 1000 includes an image capturing unit 1011, an image processing unit 1012, a lens driving unit 1013, a zoom control unit 1014, a pan driving unit 1015, a tilt driving unit 1016, a pan/tilt control unit 1017, a storage unit 1018, a control system 1019, a communication unit 1020, and an IF control unit 1021.

The image capturing unit 1011 captures an image of a subject, converts optical signals into electric signals by photoelectric conversion, and generates an electric signal corresponding to the image of the subject. Although description is provided taking a person's face as an example of the subject, another subject may be applicable. For example, the subject may be the entire human body, or may be a vehicle. Various subjects can be supported in accordance with the use case, when the subject is of interest.

The image processing unit 1012 generates image data by performing image processing and compression encoding processing on the electric signal generated by the image capturing unit 1011. Here, the image data to be generated is not limited to a single piece of data and a plurality of pieces of image data having different resolutions and image qualities may be simultaneously generated. The image processing unit 1012 transmits the generated image data to the control system 1019. In the following description, an "image" is used as a term indicating an image and image data.

The lens driving unit 1013 includes a driving system of a focus lens and a zoom lens. The operation of the lens driving unit 1013 is controlled by the zoom control unit 1014.

The zoom control unit 1014 controls the lens driving unit 1013 based on an instruction transmitted from the control system 1019. The zoom control unit 1014 transmits focus movement information and zoom movement information to the control system 1019.

The pan driving unit 1015 includes a mechanical driving system configured to perform pan operation, and a motor as a driving source. Operation of the pan driving unit 1015 is controlled by the pan/tilt control unit 1017.

The tilt driving unit 1016 includes a mechanical driving system configured to perform tilt operation and a motor as a driving source. The operation of the tilt driving unit 1016 is controlled by the pan/tilt control unit 1017.

The pan/tilt control unit 1017 controls the pan driving unit 1015 and the tilt driving unit 1016 based on an instruction transmitted from the control system 1019. The pan/tilt control unit 1017 transmits pan movement information and zoom movement information to the control system 1019.

The storage unit 1018 includes a main storage apparatus such as a Random Access Memory (RAM), and an auxiliary storage apparatus such as a Hard Disk Drive (HDD) or a Solid State Drive (SSD). For example, the storage unit 1018 provides a work area in executing a program, functions as a frame memory, and also functions as a buffer memory. The storage unit 1018 stores images, various setting commands, parameters required for executing the commands, or the like.

The control system 1019 conducts overall control of the image capturing apparatus 1000. The control system 1019 is, for example, a processor including any one of a Central Processing Unit (CPU), a Micro Processing Unit (MPU), a Graphics Processing Unit (GPU), and a Quantum Processing Unit (QPU). The control system 1019 realizes various functions by reading and deploying programs stored in the storage unit 1018. For example, the control system 1019 analyzes a camera control command being transmitted and performs processing according to the command. The control system 1019 performs an instruction of image quality adjustment to the image processing unit 1012, an instruction of zoom and focus control to the zoom control unit 1014, and an instruction of pan/tilt operation to the pan/tilt control unit 1017. The control system 1019 acquires an image generated by the image processing unit 1012 and transmits the acquired image to the communication unit 1020 and the IF control unit 1021. The control system 1019 realizes the function of the output control unit 1022 by reading a program.

The output control unit 1022 interprets a camera control command related to Pan, Tilt and Zoom (PTZ) received by the communication unit 1020 from the client apparatus 2000 via the network 3000. Based on the interpretation, the output control unit 1022 executes control to output a still image and control to output detected coordinates according to the operation status of the PTZ. Although the output control unit 1022 is described as a block in the control system 1019 of the image capturing apparatus 1000, it may be included in the image processing unit 1012 or in the client apparatus 2000. The output control unit 1022 transmits the image and the detected coordinate information to the communication unit 1020 and the IF control unit 1021.

The communication unit 1020 is connected to the network 3000 and mediates communication between the control system 1019 and an external apparatus such as the client apparatus 2000. The communication unit 1020 transmits the image transmitted from the control system 1019 to the client apparatus 2000. The communication unit 1020 receives various setting commands and camera control commands transmitted from the client apparatus 2000, and transmits the commands to the control system 1019. The communication unit 1020 transmits, to the client apparatus 2000, a response of the image capturing apparatus 1000 to the command transmitted from the client apparatus 2000.

The IF control unit 1021 outputs images transmitted from the control system 1019 to the outside, through IFs such as HDMI (trade name), 3G-SDI, or 12G-SDI connected to the image capturing apparatus 1000. The IF control unit 1021 outputs connectable IF information to the control system 1019.

A general-purpose computer such as a personal computer, a mobile terminal such as a tablet, or the like is used as the client apparatus 2000. The client apparatus 2000 includes a display unit 2001, an input unit 2002, a system control unit 2003, and a communication unit 2004.

The display unit 2001 is, for example, a display apparatus such as a liquid crystal projector or a liquid crystal monitor configured to display an image. A display unit 2001 displays an image acquired from the image capturing apparatus 1000, or a graphic user interface (referred to as a GUI in the following) configured to perform camera control.

The input unit 2002 is a pointing device such as, for example, a keyboard, a mouse, or a touch panel. The user of the client apparatus 2000 may operate the GUI via the input unit 2002.

The communication unit 2004 is connected to an external apparatus such as the image capturing apparatus 1000 via the network 3000 to be enable transmission and reception of the data. The communication unit 2004 transmits, to the image capturing apparatus 1000, various setting commands and camera control commands transmitted from the system control unit 2003. The communication unit 2004 transmits, to the system control unit 2003, an image transmitted from the image capturing apparatus 1000 and a response of the image capturing apparatus 1000 to a command transmitted from the client apparatus 2000.

The system control unit 2003 is realized, for example, by a processor. The system control unit 2003 generates various setting commands and camera control commands in response to GUI operation by the user. The system control unit 2003 transmits the generated command to the image capturing apparatus 1000 via the communication unit 2004. The system control unit 2003 receives, via the communication unit 2004, a response of the image capturing apparatus 1000 to the various setting commands and camera control commands being transmitted. The system control unit 2003 causes the display unit 2001 to display an image received from the image capturing apparatus 1000 via the communication unit 2004.

The client apparatus 2000 executes various kinds of camera controls of the image capturing apparatus 1000 via the network 3000.

First Embodiment

A first embodiment of the present invention will be described below, referring to FIG. 4. FIG. 4 is a block diagram illustrating a functional configuration of the output control unit 1022A according to the present embodiment.

The output control unit 1022A interprets a camera control command of the PTZ received by the communication unit 1020 from the client apparatus 2000 via the network 3000, and executes control to output still images and control to output detected coordinates in accordance with the operation status of the PTZ. Although the output control unit 1022A is described as a block in the control system 1019 of the image capturing apparatus 1000 in the present exemplary embodiment, it may be included in the image processing unit 1012 or in the client apparatus 2000. The output control unit 1022A includes a movement state acquisition unit 101A, a face detection unit 102A, an image output unit 103A, and an information output unit 104A. The functions of the movement state acquisition unit 101A, the face detection unit 102A, the image output unit 103A, and the information output unit 104A are realized by the control system 1019 reading programs.

The movement state acquisition unit 101A determines whether the PTZ movement state is in a state of "moving" or in a state of "suspended". For example, in a case where the pan/tilt control unit 1017 is controlling either the pan driving unit 1015 or the tilt driving unit 1016, or in a case where the zoom control unit 1014 is controlling the lens driving unit 1013, the movement state acquisition unit 101A determines that the PTZ movement state is "moving", otherwise determines that the PTZ movement state is "suspended". The movement state acquisition unit 101A outputs the determined PTZ movement state to the image output unit 103A.

The face detection unit 102A detects a face from the image data input from the image processing unit 1012. Technology such like OpenCV provided as Open Source Software (OSS) may be employed as the face detection processing. The face detection processing performed by the face detection unit 102A is not particularly specified. The face detection unit 102A acquires coordinate information of a face from a video or a still image and outputs the coordinate information to the information output unit 104A. Although the present embodiment takes face detection as an example, any information may be used as long as the information represents a position on an image such as a human body detection, object detection, manual focus guide, or autofocus frame.

The image output unit 103A acquires an image, for example, a video, acquired from the image processing unit 1012 and outputs an image of either a video or a still image obtained by pausing the video. For example, the image output unit 103A may select and output either a video or a still image depending on whether or not the angle-of-view of the image capturing unit 1011 is changed. Specifically, the image output unit 103A may determine the change of the angle-of-view based on the PTZ movement state input from the movement state acquisition unit 101A. In a case where the PTZ movement state indicates a movement, the image output unit 103A determines that the angle-of-view is changed and outputs the updated video as an image. On the other hand, in a case where the PTZ movement state indicates suspension, the image output unit 103A determines that the angle-of-view is not changed and outputs a still image obtained by pausing the video as an image. An update control method of the image output by the image output unit 103A will be described in detail, referring to FIG. 5.

FIG. 5 is a diagram illustrating an example of image output in pan movement. The angle-of-view transitions in the order of images 200A, 201A and 202A. The images 200A, 201A and 202A respectively include images of human bodies 203A, 204A and 205A. Centers 206A, 207A and 208A of the angle-of-view respectively represent the centers of the images 200A, 201A and 202A. Pieces of the coordinate information of positions corresponding to the centers 206A, 207A and 208A of the angle-of-view in real space are respectively (0, 0), (0, 0) and (−60, 0). Here, the origin position in real space may be, for example, the center position of an image at a specific time point such as the time point at which image shooting is started.

In the image 201A, which is on the way of the pan movement, a still image is output, and thus the center 207A of the angle-of-view is maintained at the (0, 0) position. In the image 202A, the image capturing direction is directed to leftward due to the pan movement, the x coordinate of the center 208A of the angle-of-view is a negative value (−60, here). When a pan movement command is accepted at the angle-of-view of the image 200A, the movement state acquisition unit 101A changes the PTZ movement state to "moving" and the pan movement is started. The movement state of PTZ in the angle-of-view of the image 201A is "moving", and thus the image output unit 103A stops the updating of the image and continues outputting a still image. When a suspension command is accepted in the angle-of-view position of the image 202A, the movement state acquisition unit 101A changes the PTZ movement state to "suspended". Accordingly, the image output unit 103A resumes the updating of the image and outputs a video. The image output unit 103A then outputs the image and control information including the PTZ movement state to the information output unit 104A.

The information output unit 104A generates and outputs additional information including at least one of a position and a range of the subject in the image. Here, in a case of outputting a video, the information output unit 104A outputs the additional information with updating the additional information. Accordingly, the information output unit 104A outputs the additional information corresponding to each frame image of the video. On the other hand, in a case of outputting a still image obtained by pausing the video, the information output unit 104A stops the updating of the additional information and outputs the additional information. The information output unit 104A thus outputs the additional information corresponding to the still image. For example, the information output unit 104A generates and outputs, as the additional information, frame information indicating the position and the range of a frame surrounding the face, based on the coordinate information of the face input from the face detection unit 102A and the control information of the image input from the image output unit 103A. The position of the frame included in the frame information may be coordinates of a relative position in the image. In addition, the information output unit 104A may generate and output, as the additional information, coordinate information of the center of the angle-of-view of the image in real space. Control of the information output unit 104A will be described in detail, referring to FIG. 6.

FIG. 6 illustrates transition of a frame of a face in pan movement. The angle-of-view transitions in the order of images 300A, 301A and 302A. The images 300A, 301A and 302A respectively include images of human bodies 303A, 304A and 305A. Centers 306A, 307A and 308A of the angle-of-view respectively represent the centers of the images 300A, 301A and 302A, respectively. Pieces of the coordinate information of the centers 306A, 307A and 308A of the angle-of-view in real space are respectively (0, 0), (0, 0) and (−60, 0). The center 307A of the angle-of-view is on the way of the pan movement, and a still image is output, and thus the center 307A of the angle-of-view is maintained at the (0, 0) position. Frames 309A and 310A are frames surrounding the faces 303A and 305A of the detected human bodies. The frames 309A and 310A are specified by additional information including plane coordinates of positions of the frames and sizes including widths and heights of the frames, based on the face detection coordinate information. For example, the additional information of the frames 309A and 310A is represented such that reference positions (x, y) indicating the center positions of the frames 309A and 310A, and values (x, y, width, height) including width and height. In a case where the upper left corner of the image is (0, 0) and the size of the image is 1920×1080, the pieces of additional information indicating the positions and ranges of the frames 309A and 310A are respectively given as, for example, (320, 540, 640, 480) and (1600, 540, 640, 480). Coordinates of the reference positions indicating the center positions of the frames 309A and 310A are the coordinates of the relative position of the subject in the image with the upper left corner of the image being the origin.

When a pan movement command is accepted in the angle-of-view of the image 300A, the movement state acquisition unit 101A changes the PTZ movement state to "moving" and starts moving the angle-of-view by the pan movement. The image output unit 103A outputs the additional information as a 0-value (0, 0, 0, 0) or a null-value (, , , ), at the timing of starting the movement, in order to stop the updating of the coordinate information of the frame 309A that has been being output. As the movement state of PTZ is "moving" in the state of the image 301A, the image output unit 103A outputs a still image without updating the image. The information output unit 104A does not update the additional information of the frame 309A, and therefore the frame surrounding the human body 301A of the image 304A is not displayed.

When the suspension command of the pan movement is accepted in the angle-of-view position of the image 302A, the movement state acquisition unit 101A changes the PTZ movement state to "suspended". Accordingly, the image output unit 103A resumes the updating of the image, whereby the video is displayed as the image 302A. The information output unit 104A resumes the updating of the detected coordinate information as the frame 310A along with the resumed image, and generates additional information (1600, 540, 640, 480). The information output unit 104A outputs the additional information of the frame 310A to the communication unit 1020 and the IF control unit 1021. An example has been described in the present embodiment in which the coordinate information of the additional information is the plane coordinates in real space or in the image, the coordinate information may be any of relative coordinates from the central angle-of-view, absolute coordinates, and spherical coordinates in real space or in the image.

Here, a procedure of control to output the detected coordinates related to the PTZ position specified after PTZ movement will be described, referring to the flowchart of FIG. 7. FIG. 7 is a flowchart illustrating a processing procedure of the output control unit.

At S101, the movement state acquisition unit 101A determines whether the PTZ movement state is "moving" or "suspended". The movement state acquisition unit 101A may determine the PTZ movement state depending on either the pan/tilt control unit 1017 is controlling the pan driving unit 1015 and the tilt driving unit 1016, or the zoom control unit 1014 is controlling the lens driving unit 1013. In a case where the PTZ movement state is determined to be "moving" (YES at S101), the movement state acquisition unit 101A outputs the acquired PTZ movement state to the image output unit 103A and advances the processing to S102. In a case where the PTZ movement state is determined to be "suspended" (NO at S101), the movement state acquisition unit 101A repeats S101.

At S102, the image output unit 103A stops the updating of the image input from the image processing unit 1012, based on the PTZ movement state indicating "moving", which has been input from the movement state acquisition unit 101A, and outputs the still image as well as control information including the PTZ movement state to the information output unit 104A. The processing then proceeds to S103.

At S103, the information output unit 104A stops the updating of the additional information of the frame of the face, based on the PTZ movement state, included in the control information, indicating "moving". The processing then proceeds to S104.

At S104, the movement state acquisition unit 101A determines whether the PTZ movement state is "moving" or "suspended". In a case where the PTZ movement state is determined to be "suspended" (YES at S104), that is, in a case where the PTZ movement has reached the target position and ended, the movement state acquisition unit 101A outputs the PTZ movement state to the image output unit 103A and advances the processing to S105. In a case where the PTZ movement state is determined to be "moving" (NO at S104), that is, in a case where the PTZ movement is continuing, the movement state acquisition unit 101A repeats S104.

At S105, the image output unit 103A resumes the updating of the image input from the image processing unit 1012, based on the PTZ movement state indicating "suspended" input from the movement state acquisition unit 101A, and outputs the video as well as control information including the PTZ movement state to the information output unit 104A. The processing then proceeds to S106.

At S106, the information output unit 104A resumes the updating of the additional information in accordance with the face coordinate information output by the face detection unit 102A, based on the PTZ movement state, included in the control information, indicating "suspended", and outputs the additional information to the communication unit 1020 and the IF control unit 1021. The processing then proceeds to S107.

At S107, the output control unit 1022A determines whether or not termination of the output control processing is input by user operation. In a case where the termination is determined to be not input (NO at S107), the output control unit 1022A advances the processing to S101, or in a case where the termination is determined to be input (YES at S107), the output control unit 1022A terminates the output control processing.

In the present embodiment, as has been described above, the updating of the additional information is stopped and the additional information is output in a case where a still image is being output, whereby it is possible to output additional information corresponding to the still image. Additionally, in the present embodiment, the additional information is output with updating the additional information in a case where a video is being output, whereby it is possible to output additional information corresponding to each frame image of the video.

In the present embodiment, a still image is output in a case where the PTZ movement state is in a moving state and the angle-of-view of the image capturing unit 1011 is changed, whereby it is possible not to display an image that is not desired to be displayed during the PTZ movement, and also possible to output additional information corresponding to the still image.

In the present embodiment, additional information is output, which includes at least one of a relative position and a range in the image of a face of the human body that is the subject, and therefore it is easy to generate and display a frame in the image.

In the present embodiment, additional information is output, which includes coordinates indicating the position in real space of the center of the angle-of-view that is the center of the image, whereby it is possible to easily determine the movement or the like of the angle-of-view in real space.

In the present embodiment, additional information is output, which includes at least one of a relative position and a range in the image of a face of the human body that is the subject, that is, at least one of a position and a range corresponding to coordinates in the image displayed in the client apparatus 2000 that is the output destination, whereby it is possible to easily generate and display the frame in the image on the client apparatus 2000.

The present embodiment can more flexibly cope with the request of the client apparatus 2000 by outputting the position and the range corresponding to the spherical coordinates in the image.

Second Embodiment

A second embodiment of the present invention will be described below, referring to FIG. 8. FIG. 8 is a block diagram illustrating a functional configuration of an output control unit 1022B according to the present embodiment.

The output control unit 1022B acquires the type of the image interface (denoted IF in the following) through which images can be output from the IF control unit 1021, and sets still image output control for each distribution IF. The output control unit 1022B interprets the camera control command of the PTZ received from the client apparatus 2000 for each distribution IF, in accordance with the setting. Based on the aforementioned interpretation, the output control unit 1022B executes control to output a still image according to the PTZ movement state and control to output additional information including frame information according to the face detection. Although the output control unit 1022B is described as a block in the control system 1019 of the image capturing apparatus 1000, it may be included in the image processing unit 1012 or in the client apparatus 2000. The output control unit 1022B includes the movement state acquisition unit 101A, the face detection unit 102A, an image output unit 103B, an information output unit 104B, and an IF output unit 105B.

The IF output unit 105B performs setting of image output for each image IF, in accordance with the type of the image IF available for distribution which is input from the IF control unit 1021. For example, the IF output unit 105B sets necessity of outputting a still image during the PTZ movement as output information (referred to as necessity setting in the following). The IF output unit 105B outputs the necessity setting set in association with each image IF to the image output unit 103B. The type of the image IF includes, without being limited to, HDMI, 3G-SDI, 12G-SDI, or the like.

The image output unit 103B performs update control of outputting the image data depending on the PTZ movement state, in accordance with the image output settings of the distribution IF input from the IF output unit 105B, the PTZ movement state input from the movement state acquisition unit 101A, and image data input from the image processing unit 1012. Update control of output by the image output unit 103B will be described in detail, referring to FIG. 9 and FIG. 10.

FIG. 9 illustrates an operation when the type of the image IF is HDMI and a still image during the PTZ movement is set to be output. The angle-of-view transitions in the order of images 200B, 201B and 202B. The images 200B, 201B and 202B include human bodies 203B, 204B and 205B as the subject. Centers 206B, 207B and 208B of the angle-of-view respectively represent the centers of the images 200B, 201B and 202B. Pieces of the coordinate information of the centers 206B, 207B and 208B of the angle-of-view in real space are respectively (0, 0), (0, 0) and (−60, 0). The image 201B, which is on the way of the pan movement, is a still image having the center 207B of the angle-of-view at the position of coordinates (0, 0). When a pan movement command is accepted in the angle-of-view of the image 200B, the movement state acquisition unit 101A changes the PTZ movement state to "moving" and starts moving. Since the PTZ movement state is "moving" in the angle-of-view of the image 201B, the image output unit 103B stops the updating of the image based on the necessity setting, and outputs the still image as well as control information including the necessity setting, the PTZ movement state, and the type of each image IF to the information output unit 104B. When the suspension command of the pan movement is accepted in the angle-of-view position of the image 202B, the movement state acquisition unit 101A changes the PTZ movement state to "suspended", and the image output unit 103B resumes the updating of the image and outputs, to the information output unit 104B, the video as well as control information including the necessity setting, the PTZ movement state, and the type of each image IF.

FIG. 10 illustrates an operation when the type of the image IF is HDMI and the necessity setting is set to not-output a still image during the PTZ movement. The angle-of-view transitions in the order of images 300B, 301B and 302B. The images 300B, 301B and 302B include human bodies 303B, 304B and 305B as the subject. Centers 306B, 307B and 308B of the angle-of-view respectively represent the centers of the images 300B, 301B and 302B. Pieces of the coordinate information of the centers 306B, 307B and 308B of the angle-of-view in real space are respectively (0, 0), (−30, 0) and (−60, 0). When a pan movement command is accepted in the angle-of-view of the image 300B, the movement state acquisition unit 101A changes the PTZ movement state to "moving" and starts moving. Although the movement state of the PTZ is "moving" in the angle-of-view of the image 301B, the image output unit 103B continues the updating of the image, based on the necessity setting and outputs the video being captured. When the suspension command of the pan movement is accepted in the angle-of-view position of the image 302B, the movement state acquisition unit 101A changes the PTZ movement state to "suspended". The image output unit 103B outputs, to the information output unit 104B, the video being updated as well as the control information including the necessity setting, the PTZ movement state, and the type of each image IF.

The information output unit 104B outputs additional information including coordinates of the frame surrounding the face of the human body or the like, based on the face coordinate information input from the face detection unit 102A and the control information including the necessity setting set for each image IF input from the image output unit 103B. The information output unit 104B will be described in detail, referring to FIG. 11 and FIG. 12.

FIG. 11 illustrates an operation when the type of the image IF is HDMI and a still image output during the PTZ movement is set to be output. The angle-of-view transitions in the order of images 400B, 401B and 402B. The images 400B, 401B and 402B include human bodies 403B, 404B and 405B as the subject. Centers 406B, 407B and 408B of the angle-of-view respectively represent the centers of the images 400B, 401B and 402B. Pieces of the coordinate information of the centers 406B, 407B and 408B of the angle-of-view in real space are respectively (0, 0), (0, 0) and (−60, 0). The image 407B, which is on the way of the pan movement, is a still image having the center of the angle-of-view being at the position of coordinates (0, 0). Frames 409B and 410B are frames surrounding the faces 403B and 405B of the detected human bodies. The frames 409B and 410B are specified by additional information of plane coordinates and sizes based on the face detection coordinate information. For example, the additional information of the frames 409B and 410B is represented by reference positions (x, y) indicating the center positions of the frames 409B and 410B, and values (x, y, width, height) including width and height. In a case where the upper left corner of the image is (0, 0) and the size of the image is 1920×1080, the pieces of additional information of the frames 409B and 410B are respectively, for example, (320, 540, 640, 480) and (1600, 540, 640, 480).

When a pan movement command is accepted in the angle-of-view of the image 400B, the movement state acquisition unit 101B changes the PTZ movement state to "moving" and starts moving the angle-of-view by the pan movement. The image output unit 103B outputs the additional information as a 0-value (0, 0, 0, 0) or a null-value (, , , ), at the timing of starting the movement, in order to stop the updating of the coordinate information of the frame 409B that has been being output. Since the movement state of PTZ is "moving" in the state of the image 401B, the image output unit 103B outputs a still image without updating the image. The information output unit 104B does not update the additional information of the frame 409, and therefore the frame surrounding the human body 404B of the image 401B is not displayed.

When the suspension command of the pan movement is accepted in the angle-of-view position of the image 402B, the movement state acquisition unit 101B changes the PTZ movement state to "suspended". Accordingly, the image output unit 103B resumes the updating of the image, whereby the video is displayed as the image 402B. The information output unit 104B resumes the updating of the detected coordinate information as the frame 410B along with the resumed image, and generates additional information (1600, 540, 640, 480).

FIG. 12 illustrates an operation when the type of the image IF is HDMI and a still image during the PTZ movement is set to be not-output. The angle-of-view transitions in the order of images 500B, 501B and 502B. The images 500B, 501B and 502B include human bodies 503B, 504B and 505B as the subject. Centers 506B, 507B and 508B of the angle-of-view respectively represent the centers of the images 500B, 501B and 502B. Pieces of the coordinate information of the centers 506B, 507B and 508B of the angle-of-view in real space are respectively (0, 0), (−30, 0) and (−60, 0).

Frames 509B, 510B and 511B are frames surrounding the faces 503B and 505B of the detected human bodies. The frames 509B, 510B and 511B are specified by the additional information of the plane coordinates and size based on the face detection coordinate information. For example, the additional information of the frames 509B, 510B and 511B is represented by reference positions (x, y) indicating the center positions of the frames 509B, 510B and 511B, and values (x, y, width, height) including width and height. In a case where the upper left corner of the image is (0, 0) and the size of the image is 1920×1080, the pieces of additional information of the frames 509B, 510B and 511B are respectively, for example, (320, 540, 640, 480), (1600, 540, 640, 480) and (1280, 540, 640, 480).

When a pan movement command is accepted in the angle-of-view of the image 500B, the movement state acquisition unit 101B changes the PTZ movement state to "moving" and starts moving the angle-of-view by the pan movement. The image output unit 103B updates the image and outputs a video even when the movement is started. The information output unit 104B continues the updating of the additional information of the frame 511B, and therefore outputs (1280, 540, 640, 480) as the additional information.

When the suspension command of the pan movement is accepted in the angle-of-view position of the image 502B, the movement state acquisition unit 101B changes the PTZ movement state to "suspended". Since the image output unit 103B continues the updating of the image, a video of the image 502B is displayed. The information output unit 104B updates and generates additional information (1600, 540, 640, 480) along with the image being updated. The information output unit 104B outputs the additional information of the frame 510B to the communication unit 1020 and the IF control unit 1021.

The blocks other than those described above are similar to those of the first embodiment and therefore description thereof will be omitted.

Output of additional information during the PTZ movement will be described, referring to the flowchart of FIG. 13.

At S201, the IF output unit 105B performs necessity setting of whether or not to output a still image in association with the type of image IF available for distribution which is input from the IF control unit 1021. The IF output unit 105B outputs the necessity setting of each image IF to the image output unit 103B, and advances the processing to S202.

At S202, the movement state acquisition unit 101A determines whether the PTZ movement state is "moving" or "suspended" depending on either the pan/tilt control unit 1017 is controlling the pan driving unit 1015 and the tilt driving unit 1016, or the zoom control unit 1014 is controlling the lens driving unit 1013. In a case where the PTZ movement state is determined to be "moving" (YES at S202), the movement state acquisition unit 101A outputs the PTZ movement state to the image output unit 103B and advances the processing to S203. In a case where the PTZ movement state is determined to be "suspended" (NO at S202), the movement state acquisition unit 101A repeats S202.

At S203, the output control unit 1022B repeats the processing from S204 to S207 as many times as the number of types of image IFs available for distribution which are input from the IF control unit 1021.

At S204, the image output unit 103B determines whether or not it is necessary to output a still image during the PTZ movement, based on the necessity setting set by the IF output unit 105B for the image IF to be determined. In a case of determining to output a still image during the PTZ movement (YES at S204), the image output unit 103B advances the processing to S205. In a case of determining not to output a still image during the PTZ movement (NO at S204), the image output unit 103B advances the processing to S207 without stopping the updating of the image and the additional information.

At S205, the image output unit 103B stops the updating of the image and outputs, to the information output unit 104B, the still image, as well as the control information including the PTZ movement state, the necessity setting, and the type of the image IF which are associated with the image IF.

At S206, the information output unit 104B stops the updating of the additional information of the frame surrounding the face, based on information to the effect that the still image is to be outputted, which is indicated by the necessity setting included in the control information.

At S207, the output control unit 1022B repeats the processing as many times as the number of types of image IFs available for distribution which is input from the IF control unit 1021 at S203. The output control unit 1022B repeats as many times as necessary and then advances the processing to S208.

At S208, the movement state acquisition unit 101A determines whether the PTZ movement state is "moving" or "suspended", depending on either the pan/tilt control unit 1017 is controlling the pan driving unit 1015 and the tilt driving unit 1016, or the zoom control unit 1014 is controlling the lens driving unit 1013. In a case where the PTZ movement state is determined to be "suspended" (YES at S208), the movement state acquisition unit 101A outputs the PTZ movement state to the image output unit 103B and advances the processing to S209. In a case where the PTZ movement state is "moving" (NO at S208), the movement state acquisition unit 101A repeats S208.

At S209, the output control unit 1022B repeats the processing from S210 to S213 as many times as the number of types of image IFs available for distribution which is input from the IF control unit 1021.

At S210, the image output unit 103B advances the processing to S211 in a case where the necessity setting indicating the necessity of outputting a still image during the PTZ movement, which is set by the IF output unit 105B in association with the type of the image IF to be determined, is set to output the still image (YES at S210). In a case where the necessity setting is set to not-output a still image (NO at S210), the image output unit 103B advances the processing to S213.

At S211, the image output unit 103B resumes the updating of the image, which is being paused, and generates a video. The image output unit 103B outputs, to the information output unit 104B, the video, as well as the control information including the PTZ movement state, the necessity setting, and the type of the image IF which are associated with the image IF. The processing then proceeds to S212.

At S212, the information output unit 104B resumes the updating of the additional information in accordance with the face coordinate information output by the face detection unit 102A, based on the PTZ movement state, included in the control information, indicating "suspended", and outputs the additional information to the communication unit 1020 and the IF control unit 1021. The processing then proceeds to S213.

At S213, the output control unit 1022B repeats the processing as many times as the number of types of image IFs available for distribution which is input from the IF control unit 1021 at S210. The output control unit 1022B repeats as many times as necessary and then advances the processing to S214.

At S214, the output control unit 1022B determines whether or not termination of the output control processing is input by user operation. In a case where the termination is determined to be not input (NO at S214), the output control unit 1022B advances the processing to S202, or in a case where the termination is determined to be input (YES at S214), the output control unit 1022B terminates the output control processing.

In the present embodiment, as has been described above, either a video or a still image is output, based on the necessity setting associated with each of the plurality of image IFs through which images are output. Accordingly, the present embodiment can flexibly and appropriately output a video or a still image for each image IF.

In the present embodiment, the necessity of the updating of the additional information is determined based on the necessity setting, and therefore additional information can be more appropriately updated.

Although preferred embodiments of the present invention have been described above, the present invention is not limited to such embodiments, and various modifications and changes can be made within the scope of the gist.

For example, in the configuration of the first embodiment, the information output unit 104A may keep, while the updating of the additional information is being stopped, outputting the additional information (320, 540, 640, 480) which is the additional information before the PTZ movement state is changed to "moving", instead of outputting the additional information (0, 0, 0, 0).

OTHER EXAMPLES

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, in the aforementioned embodiment, an example has been described in which coordinates of the center of the angle-of-view of the image in real space is included in the additional information, a range in real space indicating the range of the entire image may be included in the additional information.

In the aforementioned embodiment, an example of additional information including frame information related to a face detection result has been described, the additional information may include information based on at least one of pupil detection result, autofocus, and manual focus. Accordingly, the aforementioned embodiment can support various additional information.

In the aforementioned embodiment, an example of additional information including frame information related to a face detection result has been described, the additional information may include information related to the angle-of-view of the image capturing unit such as the PTZ movement state. Therefore, the additional information can provide information related to an angle-of-view to the client apparatus or the like, and the client apparatus can generate a viewpoint in a virtual space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-131470, filed Aug. 10, 2023, which is hereby incorporated by reference herein in its entirety.

What is claimed is:

1. An image capturing apparatus comprising:
    an image output unit configured to acquire an image generated by an image capturing unit capturing an image of a subject, and output an image of either a video or a still image obtained by pausing the video; and
    an information output unit configured to update and output additional information including at least one of a position and a range of the subject in a case where the video is being output, and stop the updating of the additional information and output the additional information in a case where the still image is being output.

2. The image capturing apparatus according to claim 1, wherein the image output unit outputs the still image in a case where an angle-of-view of the image capturing unit is changed.

3. The image capturing apparatus according to claim 1, wherein the image output unit outputs either the video or the still image, based on output information associated with each of a plurality of interfaces through which the image is output.

4. The image capturing apparatus according to claim 1, wherein the information output unit determines necessity of the updating of the additional information, in a case where the still image is being output, based on output information associated with each of a plurality of interfaces through which the image is output.

5. The image capturing apparatus according to claim 1, wherein the information output unit outputs the additional information including at least one of a relative position and a range related to the subject in the image.

6. The image capturing apparatus according to claim 1, wherein the information output unit outputs the additional information including at least one of a position and a range corresponding to the image in real space.

7. The image capturing apparatus according to claim 1, wherein the information output unit outputs the additional information including at least one of a position and a range corresponding to coordinates in the image displayed at an output destination.

8. The image capturing apparatus according to claim 1, wherein the information output unit outputs the additional information including at least one of a position and a range corresponding to the image in spherical coordinates in real space.

9. The image capturing apparatus according to claim 1, wherein the information output unit outputs the additional information corresponding to the still image in a case where the still image is being output.

10. The image capturing apparatus according to claim 1, wherein the information output unit outputs the additional information including information based on at least one of face detection result, pupil detection result, auto-focus, and manual focus.

11. The image capturing apparatus according to claim 1, wherein the information output unit outputs the additional information including information related to an angle-of-view of the image capturing unit.

12. A control method of an image capturing apparatus, the method comprising:

acquiring an image generated by an image capturing unit capturing an image of a subject, and outputting an image of either a video or a still image obtained by pausing the video; and updating and outputting additional information including at least one of a position and a range of the subject in a case where the video is being output, and stopping the updating of the additional information, and outputting the additional information in a case where the still image is being output.

13. A non-transitory computer-readable storage medium storing a computer program that, when the program is read and executed by a computer, causes the computer to:

acquire an image generated by an image capturing unit capturing an image of a subject, and output an image of either a video or a still image obtained by pausing the video; and update and output additional information including at least one of a position and a range of the subject in a case where the video is being output, or stop the updating of the additional information and output the additional information in a case where the still image is being output.

* * * * *